United States Patent [19]
Halverson et al.

[11] Patent Number: 4,990,180
[45] Date of Patent: *Feb. 5, 1991

[54] COMBUSTION SYNTHESIS OF LOW EXOTHERMIC COMPONENT RICH COMPOSITES

[75] Inventors: Danny C. Halverson, Modesto; Beverly Y. Lum, Livermore; Zuhair A. Munir, Davis, all of Calif.

[73] Assignee: The United States of America as represented by the United States Department of Energy, Washington, D.C.

[*] Notice: The portion of the term of this patent subsequent to Nov. 7, 2006 has been disclaimed.

[21] Appl. No.: 401,698

[22] Filed: Sep. 1, 1989

Related U.S. Application Data

[63] Continuation-in-part of Ser. No. 225,413, Jul. 28, 1988, Pat. No. 4,879,262.

[51] Int. Cl.[5] ............................................. C22C 29/02
[52] U.S. Cl. .................................... 75/239; 75/236; 75/240; 75/244; 419/27; 419/45
[58] Field of Search ............... 75/236, 244, 239, 240; 419/45, 27

[56] References Cited

U.S. PATENT DOCUMENTS

| | | | |
|---|---|---|---|
| 3,353,954 | 11/1967 | Williams | 75/201 |
| 4,327,156 | 4/1982 | Dillon et al. | 428/568 |
| 4,432,795 | 2/1984 | Andersen | 75/245 |
| 4,554,218 | 11/1985 | Gardner et al. | 428/567 |
| 4,585,618 | 4/1986 | Fresnel et al. | 419/12 |
| 4,610,726 | 9/1986 | King | 75/233 |
| 4,689,077 | 8/1987 | Chevigne et al. | 75/233 |
| 4,710,223 | 12/1987 | Matejczyk | 75/248 |
| 4,718,941 | 1/1988 | Halverson et al. | 75/236 |
| 4,746,363 | 5/1986 | DeAngelis | 75/244 |
| 4,879,262 | 11/1989 | Halverson et al. | 501/87 |

OTHER PUBLICATIONS

Crider, Joey F., "Self-Propagating High Temperature Synthesis—A Soviet Method for Producing Ceramic Materials", Ceramic Engineering & Science Proceedings, Sep.-Oct. 1982, vol. 3, pp. 519–528.

Primary Examiner—Stephen J. Lechert, Jr.
Assistant Examiner—Leon Nigohosian, Jr.
Attorney, Agent, or Firm—Henry P. Sartorio; L. E. Carnahan; William R. Moser

[57] ABSTRACT

A self-sustaining combustion synthesis process for producing hard, tough, lightweight, low exothermic potential product (LEPP)/high exothermic potential product (HEPP) composites is based on the thermodynamic dependence of adiabatic temperature and product composition on the stoichiometry of the LEPP and HEPP reactants. For lightweight products the composition must be relatively rich in the LEPP component. LEPP rich composites are obtained by varying the initial temperature of the reactants. The product is hard, porous material whose toughness can be enhanced by filling the pores with aluminum or other metal phases using a liquid metal infiltration process. The process can be extended to the formation of other composites having a low exothermic component.

20 Claims, 8 Drawing Sheets

300 K  800 K  1200 K

COMBUSTION SYNTHESIS OF LOW EXOTHERMIC COMPONENT RICH COMPOSITES

RELATED APPLICATIONS

This application is a continuation-in-part (CIP) of Ser. No. 225,413, filed July 28, 1988, now U.S. Pat. No. 4,879,262.

BACKGROUND OF THE INVENTION

The United States Government has rights in this invention pursuant to Contract No. W-7405-ENG-48 between the United States Department of Energy and the University of California for the operation of Lawrence Livermore National Laboratory.

The invention relates generally to hard, tough lightweight composite materials, and more particularly to $B_4C/TiB_2$ and other low exothermic component rich composites and methods of making same.

U.S. Pat. No. 4,605,440 issued Aug. 12, 1986 to Halverson et al describes $B_4C$-reactive metal composites, Particularly $B_4C$-Al composites, and methods of making same. The process involves achieving the conditions for liquid phase sintering of the metal and $B_4C$ to occur. A variety of consolidation techniques can be used, with lower temperature and pressure methods being preferred. Fully dense composites with tailorable microstructures can be produced.

U.S. Pat. No. 4,718,941 issued Jan. 12, 1988 to Halverson et al. describes an improved infiltration process in which a chemically pretreated porous $B_4C$ or other boron or boride ceramic matrix or sponge is infiltrated with molten aluminum or other metal to form metal-ceramic composites.

Previous attempts to fabricate $B_4C$-Ti composites using liquid-phase sintering or infiltration approaches were unsuccessful because of the rapid diffusion of boron and carbon atoms into titanium. This rapid diffusion phenomenon, "capillary-kinetic slowdown," results in the inhibition of the capillary action of molten titanium in porous $B_4C$ compacts because of the formation of titanium borides and titanium carbides at the titanium surface prior to melting.

Attempts at conventional sintering and hot pressing at temperatures greater than 2273K have always resulted in microstructures that were rich in $TiB_2$, with $B_4C$ as the minor accompanying phase.

Combustion synthesis of powder compacts has been used to produce a variety of refractory ceramic materials including nitrides and nitride-oxide composites. The process uses heat evolved during spontaneous chemical reactions between mixtures of solids or solids and gases produced as a combustion wave initiated by an ignition source rapidly propagates through the compact. The key to self-propagating high temperature synthesis (SHS) is that once initiated highly exothermic reactions will become self-sustaining and will propagate through the reactant mixture in the form of a combustion wave. As the combustion wave (front) advances, the reactants are converted to products. A major advantage of SHS as a process for the synthesis of materials is the energy savings associated with the use of self-sustaining reactions. However, the combustion synthesis of $B_4C$, SiC, $Al_4C_3$, $NbAl_3$, $NbGe_2$, $TaSi_2$, $Mo_2C$, $MoB_2$, $Mo_2B$, $Mo_3Si$, W, $WB_2B_5$, and $WB_2$ is not possible because they are low exothermic materials so the reaction does not generate enough heat to sustain the process.

SUMMARY OF THE INVENTION

It is an object of the invention to develop hard, tough materials that are light in weight.

It is a further object of the invention to produce various composites which are rich in a low exothermic component by means of combustion synthesis.

It is also an object to obtain various $B_4C/TiB_2$ compositions by means of combustion synthesis.

It is another object of the invention to obtain $B_4C/TiB_2$ compositions which are rich in $B_4C$.

The invention is a combustion synthesis method for making $B_4C/TiB_2$ composites by self-propagating combustion synthesis of a powder compact using the highly exothermic Ti-B reactions to drive the low exothermic $B_4C$ formation. The powder compact is formed of B, C and Ti powders, or hydrides thereof, or oxides thereof, or mixtures thereof in the proper ratios to produce the desired products. The invention includes the formation of a $B_4C$ rich composite by preheating (exoboosting) the powder compact, and also includes the resulting $B_4C/TiB_2$ ceramic composites. The invention also includes the infiltration of the ceramic composite with a molten metal, and the resulting dense infiltrated metal-ceramic composite.

To produce lightweight composites (theoretical density less than 3.0 g/cm$^3$) by the invention, a two step process is used. First, the maximization of the lighter $B_4C$ component in the $B_4C/TiB_2$ product is achieved by increasing the initial temperature of the reactants prior to combustion in the synthesis process (exothermic boosting). Second, the infiltration of a low-density metal phase, e.g. aluminum or an aluminum alloy, is used to densify the porous $B_4C/TiB_2$ products that result from the synthesis process. These materials are hard, and their toughness is improved intrinsically through their multiphase nature and extrinsically through the infiltration of a molten metal phase into the resultant porous product.

Thus, the invention encompasses the processes of forming a $B_4C/TiB_2$ matrix with a controllable product mole ratio, particularly a $B_4C$ rich mole ratio, by self-propagating combustion synthesis, and then infiltrating the matrix to form a fully dense composite, as well as the matrix and infiltrated composite formed by the processes.

More generally the invention encompasses a method of self-propagating combustion synthesis of a mixture of materials wherein exothermic heat of reaction from a high adiabatic temperature material is used to produce combustion of low exothermic materials. The invention involves exothermic boosting or increasing the exothermic Potential of self-propagating high temperature synthesis (SHS) reactions in a powder compact including low exothermic reactants by preheating the reactants to a temperature determined by the desired product mole ratio. By this method low exothermic SiC can be formed by using a Si-C-Ti or Si-C-Mo compact so that the high exothermic Ti-C and Mo-Si reactions produce $TiC/SiC$ and $MoSi_2/SiC$ composites, respectively. Preheating of the compact allows control of the resulting mole ratios so that a high concentration of the low exothermic material is produced. A large number of composites of low exothermic potential products (LEPPs) and high exothermic potential products (HEPPs), which are rich in the LEPP component, can be produced using exothermically boosted SHS reactions.

DETAILED DESCRIPTION OF THE PREFERRED EMBODIMENTS

The invention is a method and product of forming composite materials where the major phase is a low exothermic potential product (LEPP) and the minor phase is a high exothermic potential product (HEPP) by self-propagating high temperature synthesis (SHS). The invention is based on "exoboosting" or exothermically boosting the reactants by increasing the pre-ignition temperature of the reactants prior to exothermic combustion. The preignition temperature is a function of the desired product mole ratio of the LEPP/HEPP composite. In accordance with the invention, a wide variety of composites of low exothermic potential (LEP) and high exothermic potential (HEP) materials can be produced, with the LEPP as the major phase.

Figure 1:
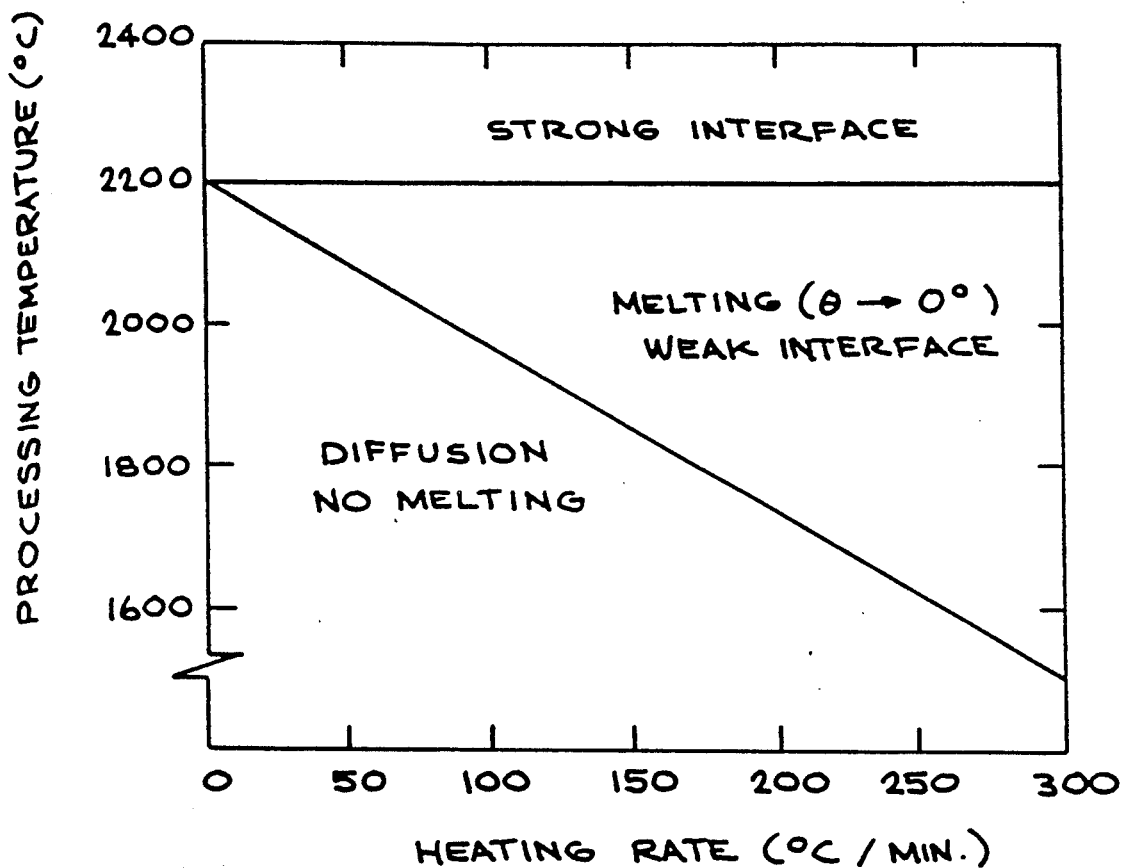
FIG. 1 is a graph of titanium sessile-drop characteristics on boron carbide.

One particular example is the synthesis of $B_4C$-based composites where $B_4C$ is the major phase. Although liquid phase sintering of $B_4C$-Ti has proven unsuccessful, it is possible, however, to overcome capillary-kinetic slowdown by increasing the rate of heating during processing so that the titanium melts before the diffusion-associated formation of borides and carbides occurs. This effect is shown in FIG. 1 for the $B_4C$-Ti system. For titanium to melt and wet ($\theta \leq 90°$) $B_4C$ near the melting point of titanium, it is necessary to heat the system at 300° C. per minute or faster.

Even with this rapid heating, however, the interface between the $B_4C$ and titanium is weak because of the presence of excessive TiB. At temperatures near the melting point of titanium, wetting is driven by the initial reaction:

$$5Ti + B_4C \rightarrow 4TiB + TiC. \tag{1}$$

When the processing temperature is increased to 2473K, a strong interfacial bond between $B_4C$ and titanium is possible through the reaction:

$$3Ti + B_4C \rightarrow 2TiB_2 + TiC. \tag{2}$$

This strong interface is attributable to the presence of $TiB_2$ rather than TiB. It should be noted that TiB undergoes peritectic decomposition to liquid + TiB near 2473K.

Because rapid heating rates and high temperatures are required to fabricate $B_4C$-Ti composites, combustion synthesis appears to be the most practical processing approach.

THEORY

Table 1 shows the product phases that are possible using elemental boron, carbon, and titanium reactants and shows some of their physical properties that are relevant to meeting the objectives of this invention and the combustion synthesis process in general. $B_4C$ has a very low adiabatic temperature of 1000K, compared to its melting point of 2740K, so it will be very difficult, if not impossible, to form by self-sustaining combustion synthesis.

TABLE 1

| | Properties of product phases. | | | | |
|---|---|---|---|---|---|
| Phase | $T_{mp}$ (K) | $T_{ad}$ (K) | $\Delta H°_{f,298K}$ (cal/mol) | $\rho_{th}$ (g/cm³) | H (kg/mm²) |
| $B_4C$ | 2740 | 1000 | −17,000 | 2.52 | 2750–4950 |
| TiB | 2500[a] | 2600 | −38,386 | 4.56 | — |
| $TiB_2$ | 3190 | 3190 | −77,400 | 4.50 | 3000–3600 |
| TiC | 3290 | 3290 | −44,100 | 4.93 | 1550–3200 |
| SiC | 3100 | 1800 | −16,000 | 3.17 | 2100–3300 |

[a]Decomposes rather than melts at this temperature.

Production of $B_4C/TiB_2$ microstructures was pursued because (1) these phases were dominant in the strong, interfacially bonded materials previously produced by liquid phase sintering; (2) these phases exhibit the highest hardnesses with the lowest theoretical densities; (3) boron carbide has a low melting point relative to the adiabatic temperature of $TiB_2$, which should result in $B_4C$-liquid rearrangement of crystalline $TiB_2$ for increasing product density; (4) titanium diboride exhibits the largest heat of formation (exothermic potential) and will be of the greatest assistance in producing $B_4C$, which has a small exothermic potential.

Some possible reactions and the theoretical densities of their products are shown in Table 2. Because a product with low specific gravity is desired, those reactions that produce $B_4C$-rich microstructures are most desirable. To determine the optimum composition it is necessary to first calculate the adiabatic combustion temperature for the following three general cases:

$$x\Delta H^0_{fB_4C}(T_0) + y\Delta H^0_{fTiB_2}(T_0) = \tag{3}$$

$$x \int_{T_0}^{T_{ad}} C_p(s)_{B_4C} dT + y \int_{T_0}^{T_{ad}} C_p(s)_{TiB_2} dT.$$

$$x\Delta H^0_{fB_4C}(T_0) + y\Delta H^0_{fTiB_2}(T_0) = \tag{4}$$

$$x \int_{T_0}^{T_{mp}} C_p(s)_{B_4C} dT + xv\Delta H_{mB_4C} + y \int_{T_0}^{T_{mp}} C_p(s)_{TiB_2} dT.$$

$$x\Delta H^0_{fB_4C}(T_0) + y\Delta H^0_{fTiB_2}(T_0) = \tag{5}$$

$$x \int_{T_0}^{T_{mp}} C_p(s)_{B_4C} dT +$$

-continued $$x\Delta H_{mB_4C} + x \int_{T_{mp}}^{T_{ad}} C_p(l)_{B_4C} dT + y \int_{T_0}^{T_{ad}} C_p(s)_{TiB_2} dT.$$

where
- $C_p(l)$=specific heat of a particular liquid product phase,
- $C_p(s)$=specific heat of a particular solid product phase,
- $\Delta H_f^o$=heat of formation of a specific product phase,
- $\Delta H_m$=heat of melting of a specific product phase,
- $T_o$=initial temperature of reactants before combustion,
- $T_{ad}$=adiabatic temperature,
- $T_{mp}$=melting-point temperature,
- v=volume percent of $B_4C$ melted,
- x=number of moles of $B_4C$ in product,
- y=number of moles of $TiB_2$ in product.

TABLE 2

Selected B-C-Ti reactions ($\rho_{th}$ in g/cm$^3$).

| | | | | |
|---|---|---|---|---|
| 10B + C + 3Ti | → | $B_4C$ + 3TiB$_2$ | (3.86) |
| 8B + C + 2Ti | → | $B_4C$ + 2TiB$_2$ | (3.68) |
| 6B + C + 2Ti | → | $B_4C$ + TiB$_2$ | (3.34) |
| 10B + 2C + 2Ti | → | 2$B_4C$ + TiB$_2$ | (3.04) |
| 14B + 3C + Ti | → | 3$B_4C$ + TiB$_2$ | (2.90) |
| 18B + 4C + Ti | → | 4$B_4C$ + TiB$_2$ | (2.82) |
| 22B + 5C + Ti | → | 5$B_4C$ + TiB$_2$ | (2.76) |

Equations (3) and (5) can be used to calculate the adiabatic temperatures below and above the melting point of $B_4C$, respectively. Equation (4) is used to determine the percent of $B_4C$ melted when the adiabatic temperature is equal to the melting point of $B_4C$. Equations (3) through (5) can also be used to calculate the adiabatic temperatures (percent of $B_4C$ melted) at different initial temperatures for any $B_4C/TiB_2$ mole ratio. Thus equations (3)–(5) show how to raise the initial temperature $T_o$ to get a higher adiabatic temperature to produce a greater amount of $B_4C$. Otherwise, because the adiabatic temperature of $B_4C$ is so low, as shown in Table 1, if all the heat is provided by $TiB_2$ formation without raising the initial temperature, very little $B_4C$ is formed.

Figure 2:
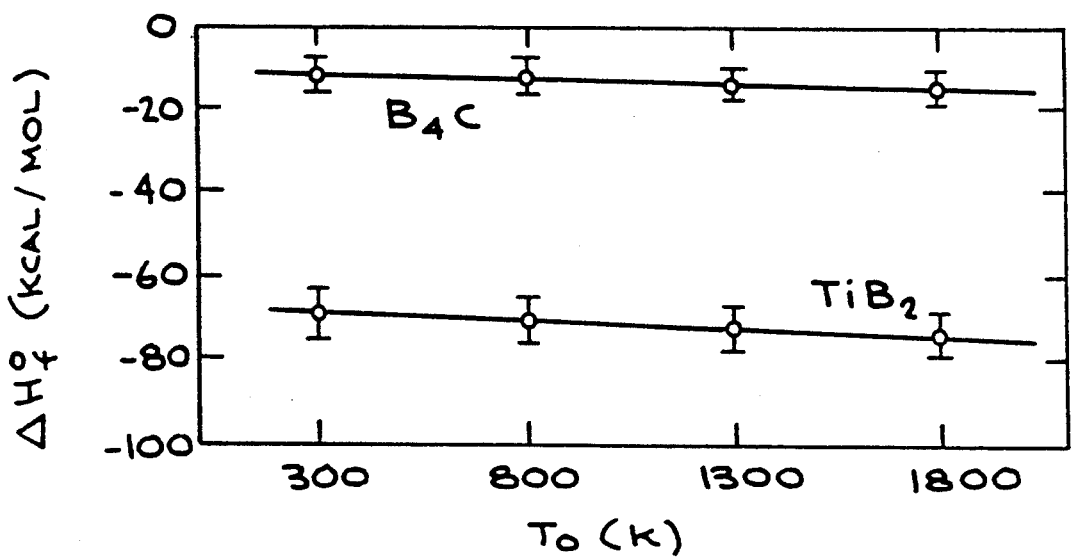
FIG. 2 shows the variation of the heat of formation of $B_4C$ and $TiB_2$ with temperature.

The adiabatic temperatures for mole ratios of $B_4C/TiB_2$ up to 5 at initial temperatures of 300, 800, 1300, and 1800K were calculated. Since the initial temperature is a variable in these calculations, the appropriate enthalpies of formation of $B_4C$ and $TiB_2$ must be used. FIG. 2 shows how these functions vary with temperature. Only minor changes occur for $B_4C$ and $TiB_2$ between 300 and 1800K.

Figure 3:
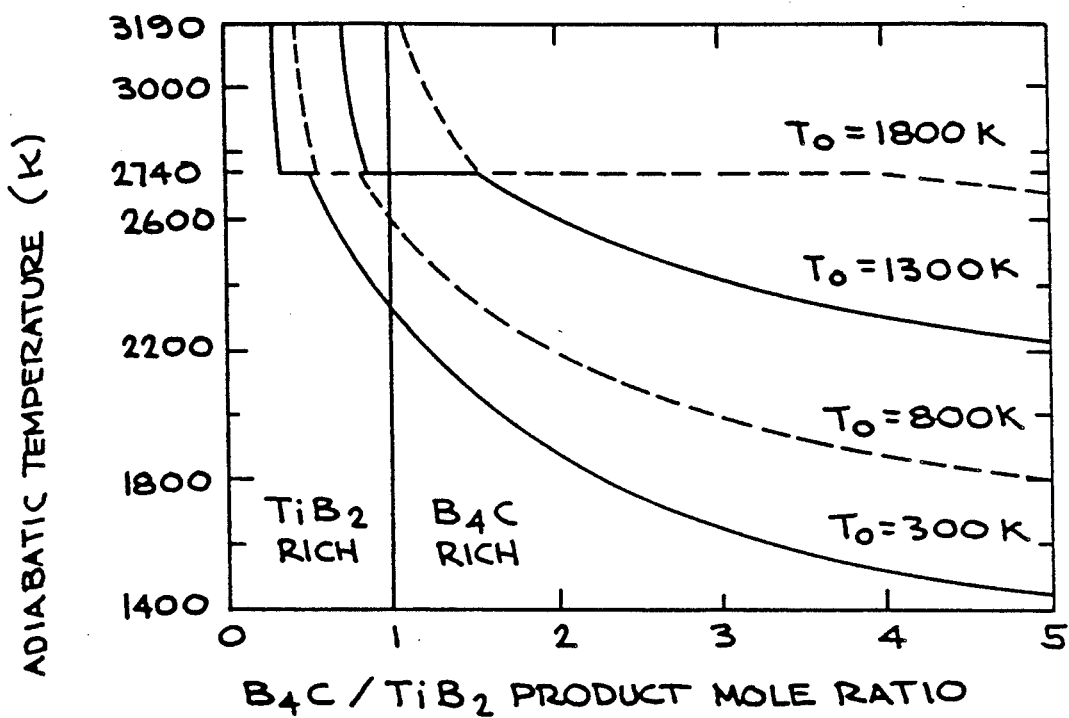
FIG. 3 is a graph of adiabatic temperatures as a function of $B_4C/TiB_2$ product mole ratios at different initial temperatures.

FIG. 3 shows the results of the computer-generated adiabatic temperatures as functions of $B_4C/TiB_2$ product mole ratios at different initial temperatures. These results point to certain key factors for the processing of these materials. First and most important is that the theoretical adiabatic temperature can be increased for increasing mole ratios of $B_4C/TiB_2$ products by simply increasing the initial temperature of the reactants prior to combustion. In addition, the range of mole ratios from the onset of $B_4C$ melting (right-hand side of the flat region on each curve at 2740K) to the completion of $B_4C$ melting (left-hand side of the flat region) increases as the initial temperature increases. The experimental production of $B_4C$-rich microstructures is achieved by applying these principles of the invention.

EXPERIMENTAL PROCEDURE/EXAMPLES

Figure 4:
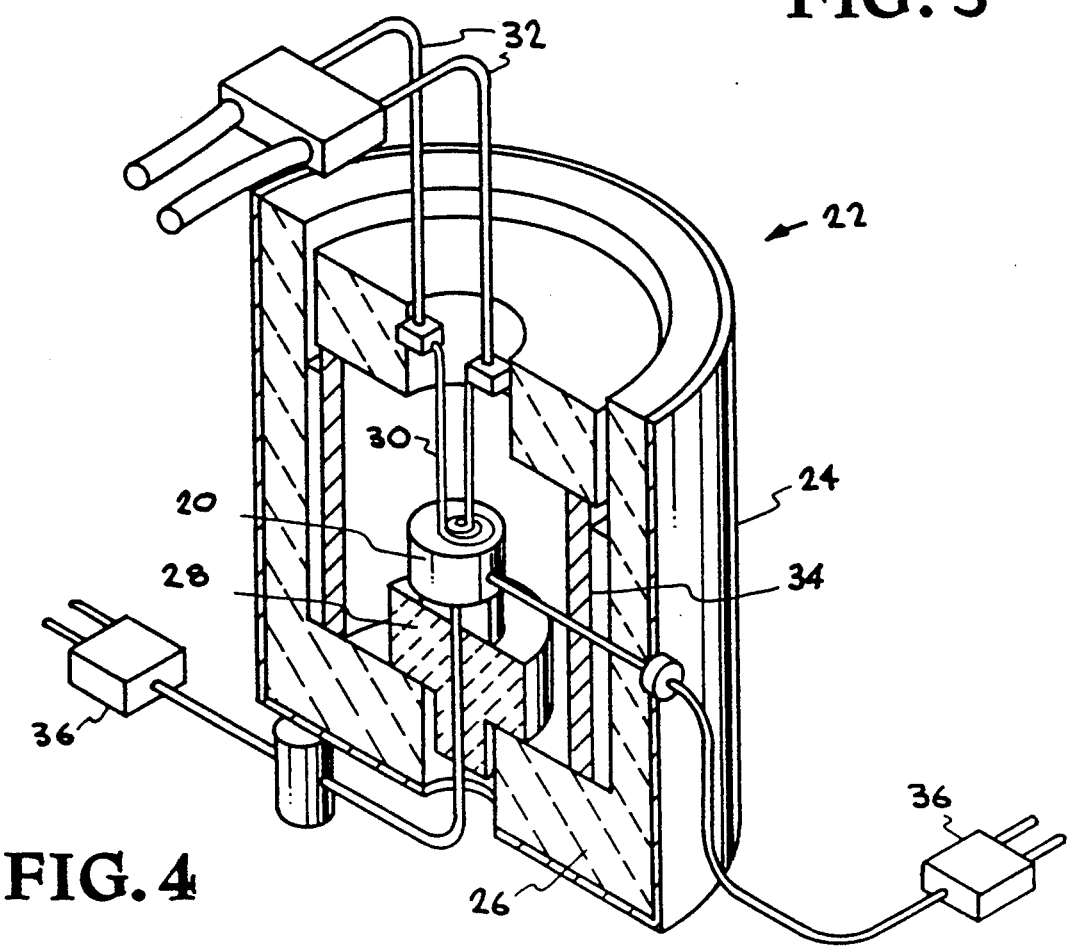
FIG. 4 is a perspective sectional view of a temperature-controlled combustion chamber.
Figure 5:
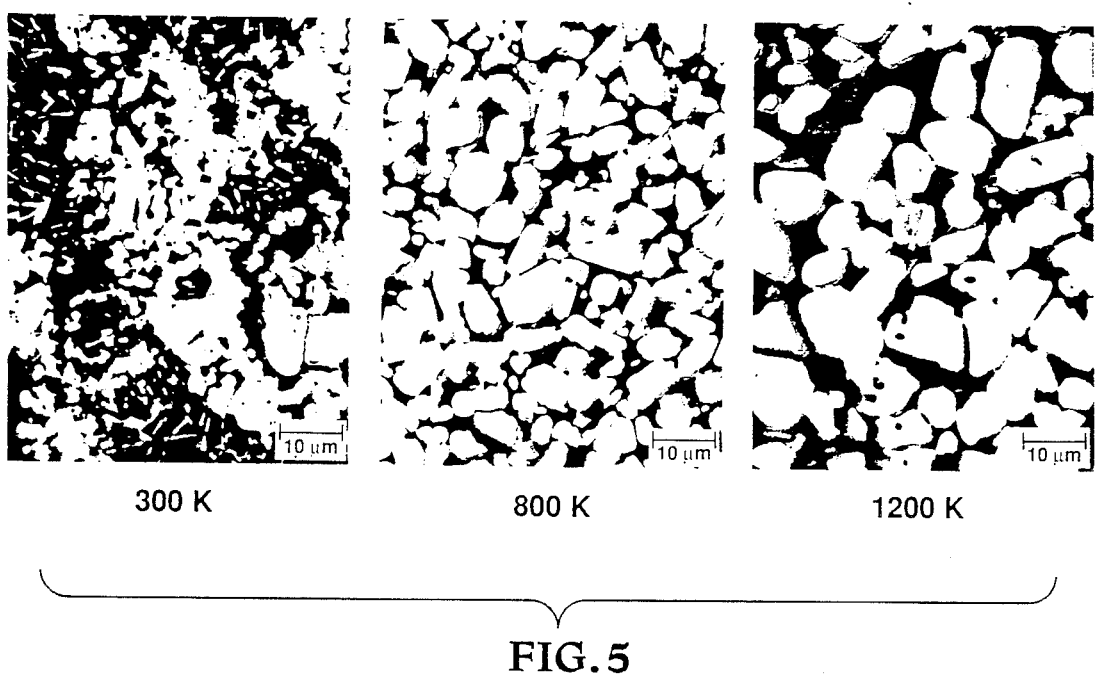
FIGS. 5, 6, and 7 are petrographic comparisons for a $B_4C/TiB_2$ product mole ratio of 0.5, 1.0, and 2.0, respectively, synthesized at different initial temperatures.

Experiments were performed using elemental boron, carbon, and titanium powders The materials used were Callery amorphous boron (24.5 m$^2$/g), washed in CH$_0$OH for 72 hours to remove $B_2O_3$; Cabot Monarch-700 amorphous carbon (234 m$^2$/g), stored in air; and Alfa 99883 α-titanium (13.3 m$^2$/g), stored in argon. Appropriate amounts of these reactants were weighed out to produce $B_4C/TiB_2$ mole ratios of 0.5, 1.0, 1.5, 2.0, and 3.0. The reactant powders were vibratory-mixed for 5 minutes and then axially pressed at 27.6 MPa (4000 psi) into pellets 2.54 cm (1 in.) in diameter by 2.54 cm high. No binders or solvents were used during mixing or pressing but binders could be used. The pellets were ignited in a temperature controlled combustion chamber as shown in FIG. 4. Chamber 22 is formed in a stainless steel can 24 with a thick thermally insulating material 26 therein. A pellet 20 is placed on a graphite pedestal 28 inside chamber 22. Experiments were carried out in the combustion chamber, which was placed in an argon glove box containing less than 6 ppm of oxygen. Ignition within the chamber was accomplished using a resistance-heated tungsten coil 30 which is connected to electrodes 32. Alternatively other ignition sources such as lasers or primer pellets such as $TiB_2$ may be used. Because of the temperature limitation of the clamshell heater 34 which is used to preheat the chamber and pellet, only initial temperatures of 300, 800, and 1200K were studied. Pellet temperature was monitored internally and externally using chromel-alumel thermocouples 36. Initial temperatures above room temperature were reached by heating the pellet at 7K per minute. Pellets that underwent combustion were petrographically examined and X-rayed for composition.

Table 3 and FIGS. 5 through 8 are illustrative results. Petrographic comparisons are made in FIGS. 5, 6, and 7 for the $B_4C/TiB_2$ product mole ratios of 0.5, 1.0, and 2.0, respectively. These figures and the X-ray diffraction results of Table 3 confirm that as $B_4C/TiB_2$ product mole ratios are increased, the initial temperature required to sustain combustion must also be increased. Furthermore, the amount of $B_4C$ (dark phase) rapidly increases in volume as the $B_4C/TiB_2$ product mole ratios are increased.

Different initial temperatures also result in different microstructures for a specific $B_4C/TiB_2$ mole ratio produced. For example, in FIG. 5 for a $B_4C/TiB_2$ mole ratio of 0.5, three different microstructures are illustrated. At $T_o$=300K, the adiabatic temperature is enough to sustain combustion, but it is slightly below the melting point of $B_4C$. Thus, both $B_4C$ and $TiB_2$ are synthesized in the solid state. At $T_o$=800K, the adiabatic temperature is high enough to allow 100% of the $B_4C$ to be melted. This is evidenced by the fact that the solid $TiB_2$ grains are surrounded by a previously molten $B_4C$ phase. At $T_o$=1200K, the adiabatic temperature is high enough to allow both $B_4C$ and $TiB_2$ to be molten during synthesis.

Figure 6:
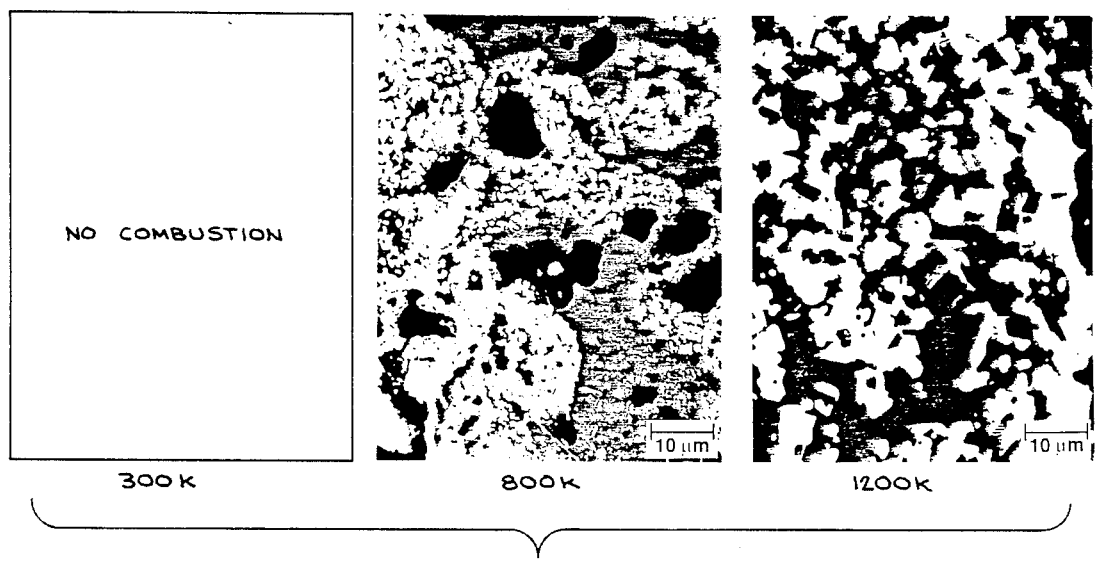

FIG. 6 shows microstructures at a $B_4C$ mole ratio of 1.0. At $T_o$=300K, the adiabatic temperature was too low to sustain combustion. At $T_o$=800K, the adiabatic temperature is less than the melting point of $B_4C$, and at $T_o$=1200K, $B_4C$ is about 80% melted.

Figure 7:
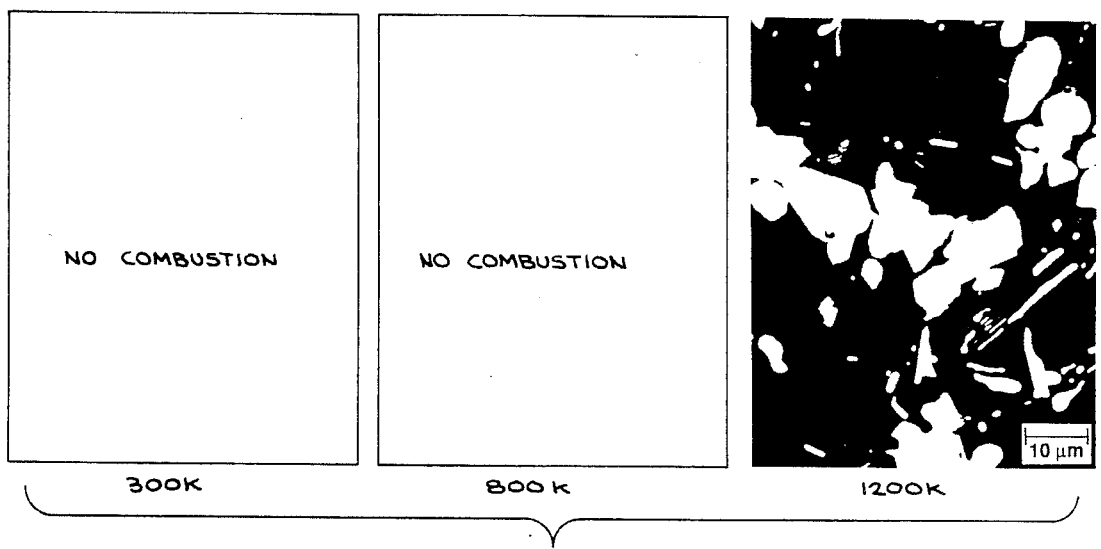

FIG. 7 shows microstructures at a $B_4C/TiB_2$ mole ratio of 2.0. Combustion was sustained only at an initial temperature of 1200K, for which the adiabatic temperature is below the melting point of $B_4C$.

TABLE 3

| B$_4$C/TiB$_2$ mole ratio | T$_o$ (K) | Qualitative phase analysis. X-ray diffraction |  |  |  |
|---|---|---|---|---|---|
|  |  | Major | Minor | Secondary | Trace |
| 0.5 | 300 | TiB$_2$ |  |  | B$_4$C |
|  | 800 | TiB$_2$ |  |  | B$_4$C |
|  | 1200 | TiB$_2$ |  | B$_4$C | TiC |
| 1.0 | 300 | N.C.$^a$ | — | — | — |
|  | 800 | TiB$_2$ |  | B$_4$C | TiC |
|  | 1200 | TiB$_2$ |  | B$_4$C | TiB |
| 1.5 | 300 | N.C.$^a$ | — | — | — |
|  | 800 | TiB$_2$ | TiC | B$_4$C |  |
|  | 1200 | TiB$_2$ |  | B$_4$C | TiC |
| 2.0 | 300 | N.C.$^a$ | — | — | — |
|  | 800 | N.C.$^a$ | — | — | — |
|  | 1200 | TiB$_2$ | B$_4$C |  | TiC |
| 3.0 | 300 | N.C.$^a$ | — | — | — |
|  | 800 | N.C.$^a$ | — | — | — |
|  | 1200 | TiB$_2$ | B$_4$C |  | TiC |

$^a$N.C. means no combustion.

Table 3 shows that it was possible to fabricate B$_4$C/TiB$_2$ product mole ratios as high as 3.0. Again, this only occurred when T$_o$=1200K. The table also shows that TiC and TiB are often formed, which is most likely due to inhomogeneities associated with the vibratory mixing process used.

Figure 8:
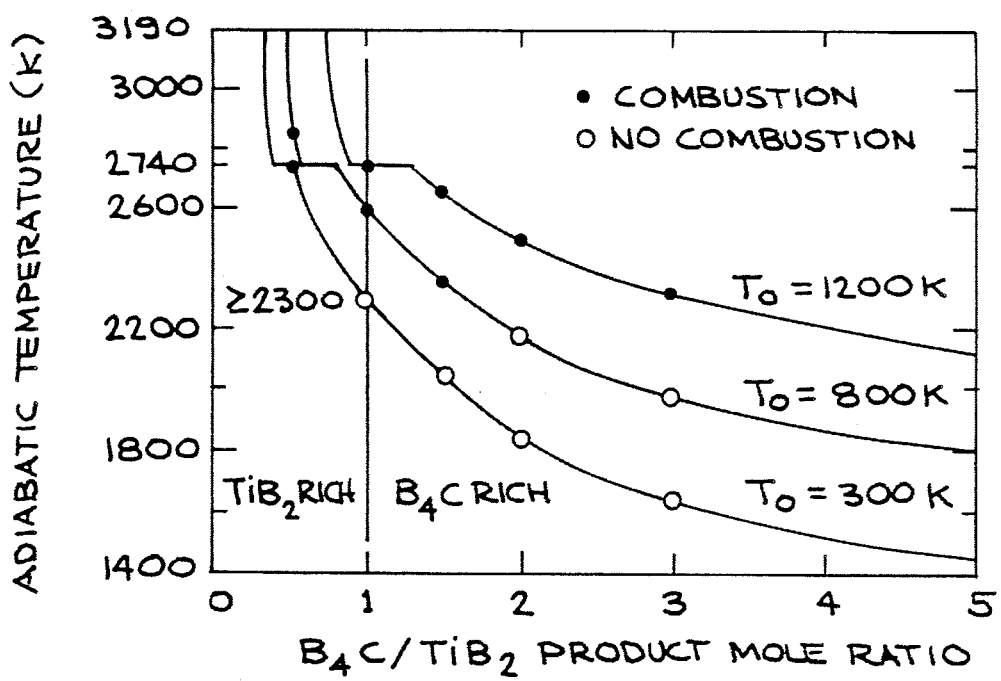
FIG. 8 shows theoretical curves and experimental results for several $B_4C/TiB_2$ product mole ratios at three initial temperatures.

FIG. 8 shows the theoretical curves calculated for T$_o$=300, 800, and 1200K, along with the experimental data points for the different B$_4$C/TiB$_2$ product mole ratios experimentally obtained. If a horizontal line is drawn between the solid and open experimental data points of FIG. 8, a critical or minimum adiabatic temperature of approximately 2300K is indicated.

The B$_4$C/TiB$_2$ products produced by combustion synthesis are not fully dense. Typically, these materials have approximately 50% porosity after synthesis, which makes them well suited for liquid-metal infiltration. Accordingly, it is also a part of the invention to form fully dense infiltrated B$_4$C/TiB$_2$ composites by infiltrating the porous structure formed by combustion synthesis with molten aluminum or other molten metal or alloy.

TABLE 4

Theoretical Densities of Infiltrated Composites.

| Precursor | Infiltrant | ρ$_{th}$ (g/cm$^3$) |
|---|---|---|
| B$_4$C + 3 TiB$_2$ | Al (40 vol %) | 3.40 |
| B$_4$C + TiB$_2$ | Al (40 vol %) | 3.08 |
| B$_4$C + TiB$_2$ | Al (40 vol %) | 2.82 |
| 5B$_4$C + TiB$_2$ | Al (40 vol %) | 2.74 |
| 5B$_4$C + TiB$_2$ | Al (40 vol %) | 2.35 |

Figure 9:
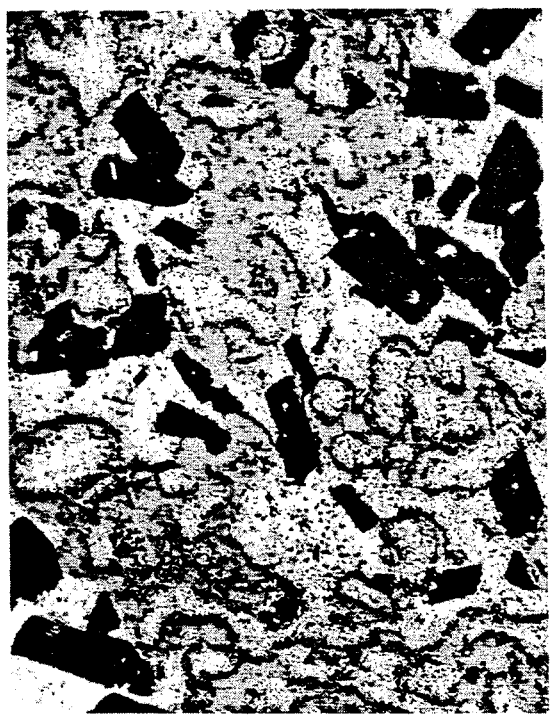
FIG. 9 shows a typical $B_4C/TiB_2$ microstructure after infiltration with aluminum

A study of the wetting behavior of aluminum on B$_4$C and TiB$_2$ substrates indicates that aluminum infiltration of these porous composites is possible at 1473K. FIG. 9 shows a typical B$_4$C/TiB$_2$ microstructure after infiltration with aluminum Table 4 shows the theoretical densities for some final precursor/infiltrant combinations.

The invention also extends to the production of other composites which include a low exothermic potential (LEP) component by combustion synthesis, particularly composites with a large amount of the low exothermic component. In accordance with the invention, a compact is produced of a mixture of reactants, some of which produce the desired low exothermic component and some of which are high adiabatic temperature (high exothermic potential, HEP) materials in appropriate ratios to produce a composite of selected component mole ratio. The compact is then ignited and the exothermic heat of reaction from the combustion of the high adiabatic temperature material provides the heat for the combustion and production of the low exothermic component. To produce a predominantly low adiabatic temperature composite, the compact must be preheated (exothermically boosted) prior to combustion. The preignition temperature is determined by the composite mole ratio.

Other examples of the invention besides B$_4$C/TiB$_2$ include TiC/SiC and MoSi$_2$/SiC. Like B$_4$C, silicon carbide SiC is a low exothermic material which cannot be produced by combustion synthesis. However, the silicon and carbon can be mixed with titanium, and the combustion synthesis of the SiC will be driven by the highly exothermic Ti-C reaction, to form a SiC/TiC composite. The thermodynamic properties for the selection of product phases in the SiC-TiC composite (as well as the B$_4$C—TiB$_2$ and B$_4$C—TiC composites) is shown in Table 1 Instead of Ti, molybdenum can be mixed with the Si—C, and the highly exothermic Mo—Si reactions will produce a SiC/MoSi$_2$ composite. The initial heating of the compact is controlled to control the amount of SiC in the composite.

More generally, a wide variety of LEPP rich LEPP/HEPP composites can be formed by the invention. Table 5 lists a number of carbides, borides, sulfides and silicides, along with their adiabatic temperatures, which may be utilized Any combination may be selected as long as the HEPP has a higher adiabatic temperature than the LEPP. Preferably, a temperature of about 2000K, e.g. 2000±200K, will be utilized as the dividing line between HEPP and LEPP. Using a component with a very HEP will provide more exothermic heat to the SHS reaction. Forming a composite with a HEPP and a component with a very low LEP will require more exoboosting (higher preignition temperature), and the higher the mole ratio of LEPP in the composite, the more exoboosting (higher Preignition temperature) will be required. It is also preferred that the HEPP and LEPP include an element in common, so that the powder compact of reactants will include fewer different materials and the stoichiometry of the product is more certain In addition to selecting LEPPs and HEPPs from Table 5, the principles of the invention can be applied to forming other LEPP/HEPP composites. A powder compact of Nb, Al and C in the proper ratios can be used to form a NbAl$_3$ rich NbAl$_3$/NbC composite, and a powder compact of Nb, Ge and C can be used to form a NbGe$_2$ rich NbGe$_2$/NbC composite by exoboosting the reactants to a preignition temperature determined by the desired amount of the LEPP (NbAl$_3$ or NbGe$_2$) in the composite.

TABLE 5

| LEP or HEP Product | Adiabatic Temp. (K) |
|---|---|
| Al$_4$C$_3$ | (1200) |
| B$_4$C | (1000) |
| Be$_2$C | (1900) |
| CaC$_2$ | (1100) |
| CdS | (2000) |
| CeS | (3000) |
| CrB$_2$ | (2470) |
| Cr$_3$Si | (1500) |
| Cr$_5$Si$_3$ | (1700) |
| CrSi$_2$ | (1800) |
| FeB | (1700) |
| HfC | (3900) |
| HfB$_2$ | (3520) |
| Ir$_2$S$_3$ | (1700) |
| LaB$_6$ | (2800) |

TABLE 5-continued

| LEP or HEP Product | Adiabatic Temp. (K) |
|---|---|
| MnS | (3000) |
| MnSi | (1550) |
| Mo$_2$B | (1500) |
| MoB | (1800) |
| MoB$_2$ | (1500) |
| Mo$_2$C | (1000) |
| Mo$_3$C$_2$ | (800) |
| MoS$_2$ | (2900) |
| Mo$_3$Si | (1200) |
| Mo$_5$Si$_3$ | (1000) |
| MoSi$_2$ | (1900) |
| NbB$_2$ | (2400) |
| Nb$_2$C | (2600) |
| NbC | (2800) |
| NbSi$_2$ | (1900) |
| NiB | (2000) |
| SiC | (1800) |
| TaB$_2$ | (2700) |
| Ta$_2$C | (2600) |
| TaC | (2700) |
| TaSi$_2$ | (1800) |
| ThC$_2$ | (2930) |
| TiB | (3350) |
| TiB$_2$ | (3190) |
| TiC | (3210) |
| Ti$_5$Si$_3$ | (2500) |
| TiSi | (2000) |
| TiSi$_2$ | (1800) |
| UC$_2$ | (1000) |
| US | (3000) |
| V$_3$B$_2$ | (2340) |
| VB | (2520) |
| VB$_2$ | (2670) |
| VC | (2400) |
| W$_2$B | (1400) |
| WB | (1700) |
| W$_2$B$_5$ | (1300) |
| W$_2$C | (800) |
| WC | (1000) |
| W$_5$Si$_3$ | (1200) |
| WSi$_2$ | (1500) |
| ZrB$_2$ | (3310) |
| ZrC | (3400) |
| Zr$_2$Si | (2600) |
| Zr$_5$Si$_3$ | (2800) |
| ZrSi | (2700) |
| ZrSi$_2$ | (2100) |

Another particular family of materials that can be used as the HEPP are aluminides, particularly the aluminides of Ni, Cu, and Ti, which shall be designated NiAl$_x$, CuAl$_x$, and TiAl$_x$ to encompass a variety of different stoichiometries which can be achieved. The reactants for the aluminide and a chosen LEPP are mixed in the desired stoichiometric ratios and combusted using exothermic boosting to produce a LEPP-aluminide composite. As an example, a powder compact of Ni, Al and B in the proper ratios can be used to form a NiB/NiAl$_x$ composite with the mole ratio controlled by the preignition temperature. As another example, a powder compact of Ni, Al, B, and C could be used to form a B$_4$C/NiAl$_x$ composite.

Once the desired LEPP and HEPP have been selected, the preignition temperature for a desired mole ratio is determined by the general equation:

$$x \cdot \Delta H_f^o(LEPP) + y \cdot \Delta H_f^o(HEPP) = \quad (6)$$

$$x \int_{T_o}^{T_{mp}(LEPP)} C_p(\text{solid, } LEPP) dT +$$

(Term 1)

$$x \cdot v \cdot \Delta H_m(LEPP) +$$

(Term 2)

$$x \int_{T_{mp}(LEPP)}^{T_{ad}} C_p(\text{liquid, } LEPP) dT +$$

(Term 3)

$$y \int_{T_o}^{T_{mp}(HEPP)} C_p(\text{solid, } HEPP) dT +$$

(Term 4)

$$y \cdot n \cdot \Delta H_m(HEPP) +$$

(Term 5)

$$y \int_{T_{mp}(HEPP)}^{T_{ad}} C_p(\text{liquid, } HEPP) dT$$

(Term 6)

where
LEPP = Low Exothermic Potential Product
HEPP = High Exothermic Potential Product
x = number of moles of LEPP
y = number of moles of HEPP
v = fraction of LEPP melted
n = faction of HEPP melted
$T_{ad}$ = adiabatic temperature of the system
$T_{mp}$(LEPP) = LEPP melting temperature
$T_{mp}$(HEPP) = HEPP melting temperature
$T_o$ = preignition temperature (exoboost temperature)
$C_p$(solid, LEPP) = specific heat under constant pressure of solid LEPP
$C_p$(solid, HEPP) = specific heat under constant pressure of solid HEPP
$C_p$(liquid, LEPP) = specific heat under constant pressure of liquid LEPP
$C_p$(liquid, HEPP) = specific heat under constant pressure of liquid HEPP
$\Delta H_f^o$(LEPP) = standard state enthalpy (heat of formation in the standard state) for LEPP
$\Delta H_f^o$(HEPP) = standard state enthalpy (heat of formation in the standard state) for HEPP
$\Delta H_m$(LEPP) = heat of fusion for LEPP
$\Delta H_m$(HEPP) = heat of fusion for HEPP For different combinations of LEPP and HEPP, the calculation may be simplified. All the terms (Terms 1–6 after the equal sign) of Equation (6) are used when $T_{ad} > T_{mp}$(HEPP). The last term (Term 6) is dropped when $T_{ad} = T_{mp}$(HEPP) $> T_{mp}$(LEPP). The last two terms (Terms 5 and 6) are dropped when $T_{mp}$(LEPP) $< T_{ad} < T_{mp}$(HEPP) and $T_{mp}$(HEPP) is replaced with $T_{ad}$. Only the first two terms and fourth term are (Terms 1, 2 and 4) required when $T_{ad} = T_{mp}$(LEPP); only the first term and the fourth term (Terms 1 and 4) are required when $T_{ad} < T_{mp}$(LEPP) and $T_{mp}$(LEPP) and $T_{mp}$(HEPP) are replaced with $T_{ad}$.

Figure 10:
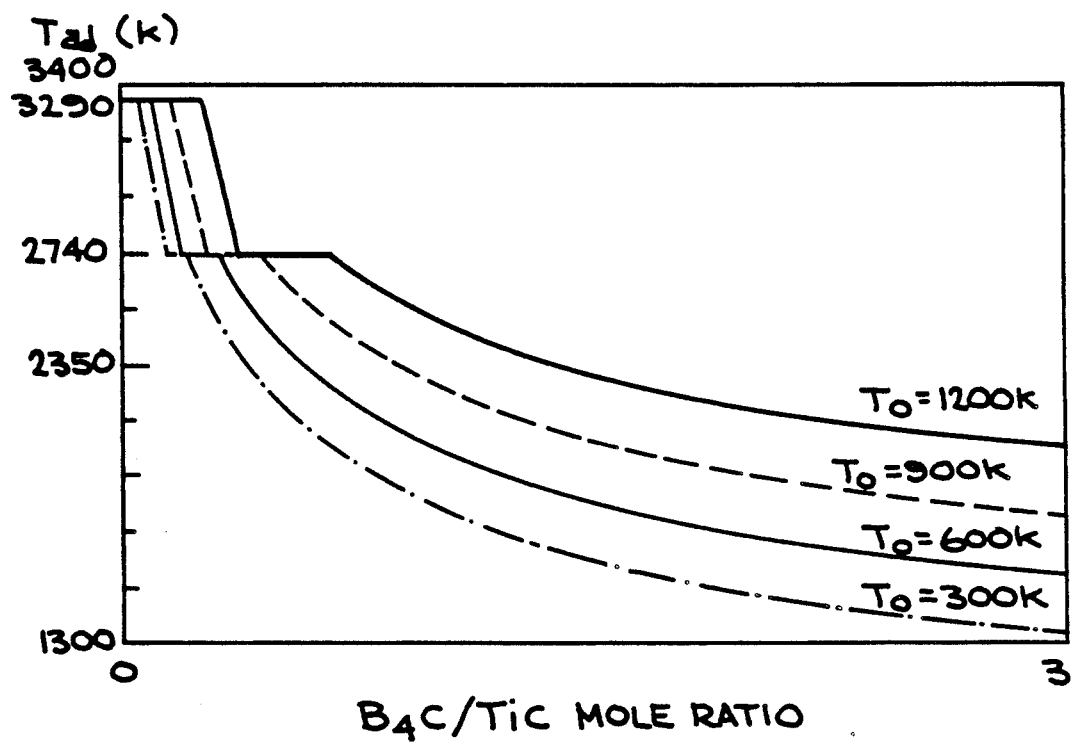
FIGS. 10 and 11 are graphs of adiabatic temperatures as a function of $B_4C/TiC$ and $SiC/TiC$ product mole ratios, respectively, at different initial temperatures.
Figure 11:
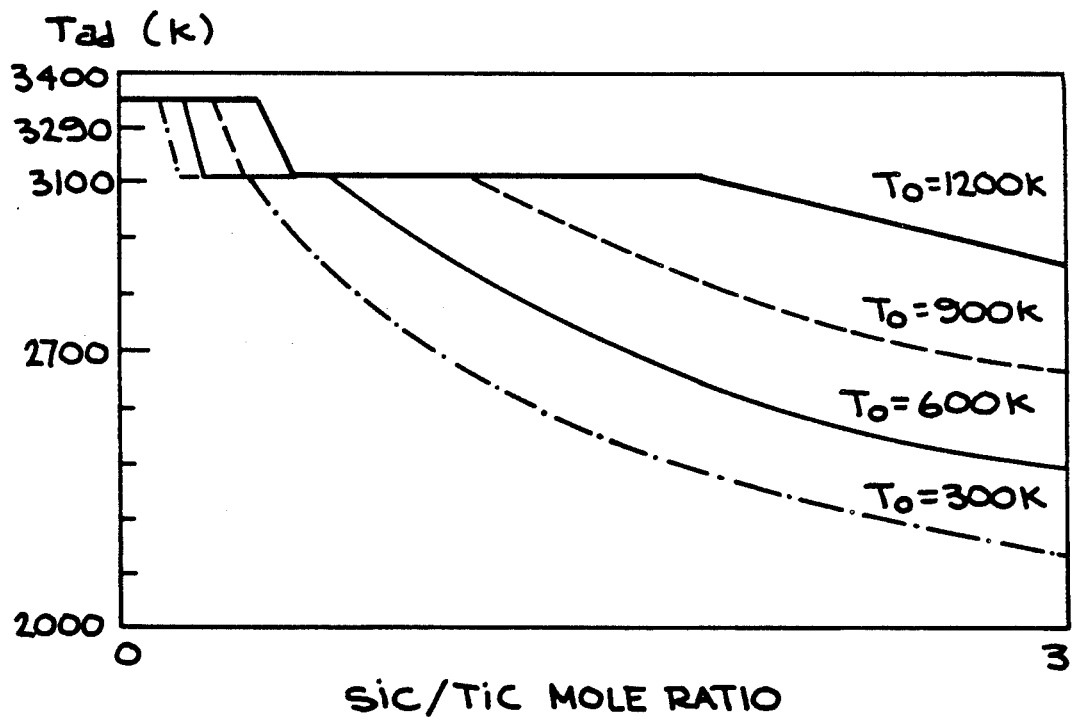

Computer generated graphs of adiabatic temperatures, as a function of product mole ratios at different initial temperatures for B$_4$C/TiC and SiC/TiC, respectively, are shown in FIGS. 10 and 11. These graphs illustrate how the method of exothermic boosting by raising the preignition temperature is used to increase the adiabatic temperature to carry out the SHS combustion of a reactant mixture which produces a $B_4C$ or SiC rich product.

Figure 12:
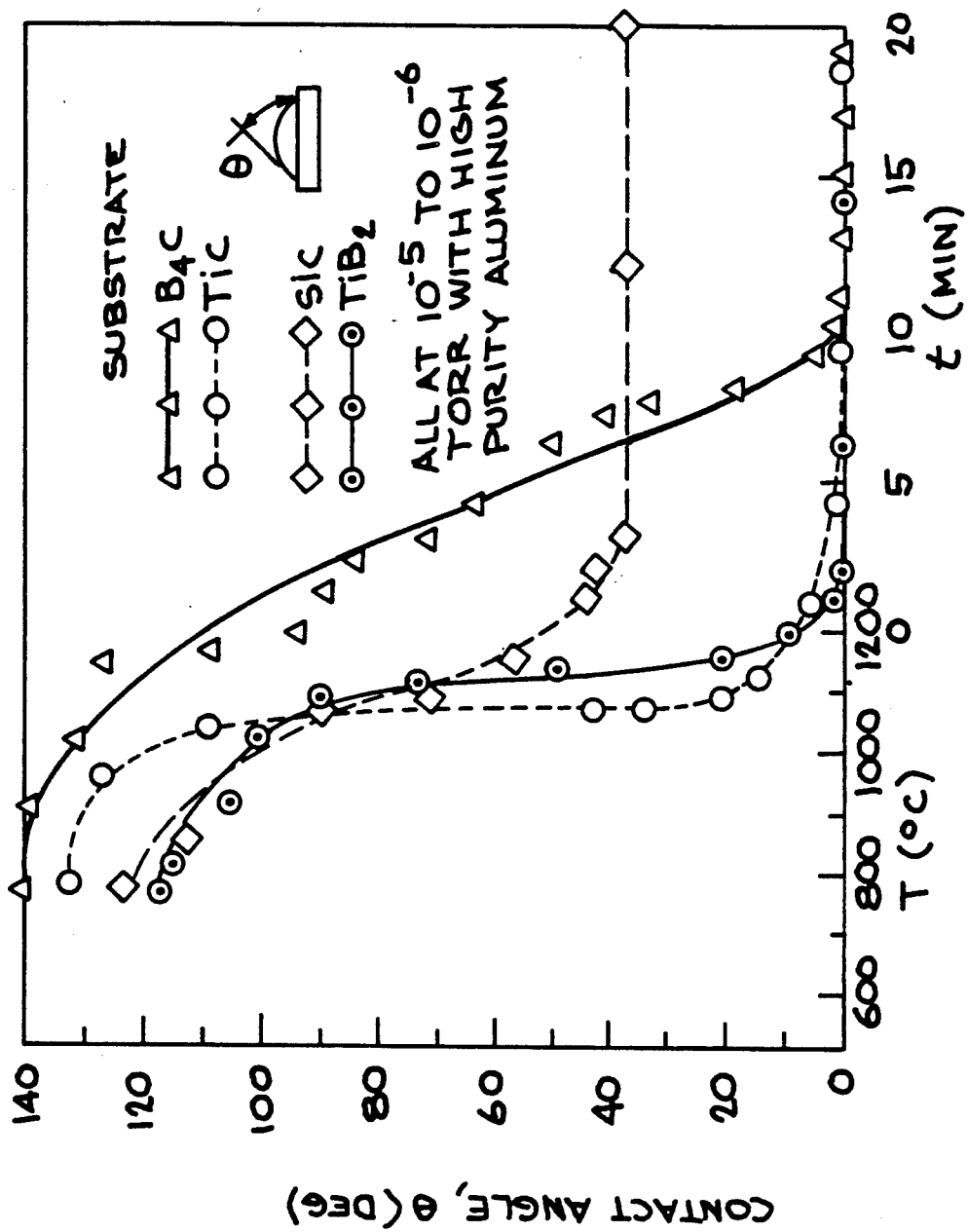
FIG. 12 is a graph of contact angle of aluminum on a number of ceramic substrates.

Once the LEPP rich ceramic preforms are produced by the SHS process using exothermic boosting, the porous preform can be infiltrated with molten metal to produce a substantially fully dense body. Contact angle data for high purity aluminum on $B_4C$, TiC, SiC and $TiB_2$ substrates is shown in FIG. 12, indicating that the two Phase ceramic preforms can be infiltrated. Preferred metals for infiltration include aluminum, nickel, titanium, zirconium, and alloys thereof. The infiltrated bodies are substantially fully dense, yet relatively light in weight, combining advantageous features of both the metal and ceramic phases. Further heat treatment leads to the product of various phases, as exemplified by the $B_4C$ metal system of U.S. Pat. No. 4,605,440.

Accordingly, it is possible to fabricate $B_4C/TiB_2$ composites infiltrated with aluminum by combining combustion synthesis and liquid-metal infiltration techniques. The synthesis of $B_4C/TiB_2$ precursors is possible because of the exothermicity associated with the $TiB_2$ reactions. The relative amount of $B_4C$ in these materials can be increased by exothermic boosting by simply increasing the initial temperature of the reactants prior to ignition. The preignition temperature is determined by the mole ratio of the product. Comparison of thermodynamic calculations with experimental results indicates that a "critical" minimum adiabatic temperature of 2300K is required to sustain combustion of the reactants. The invention also produces a large number of LEPP/HEPP combustion synthesis products, and metal infiltrated combustion synthesis products Changes and modifications in the specifically described embodiments can be carried out without departing from the scope of the invention which is intended to be limited only by the scope of the appended claims.

We claim:

1. A method of forming a composite product having a major phase of low exothermic potential product (LEPP) and a minor phase of high exothermic potential product (HEPP) and having a preselected LEPP rich LEPP/HEPP mole ratio, comprising:
   forming a powder compact of low exothermic potential (LEP) and high exothermic potential (HEP) reactants in ratios which produce the desired LEPP/HEPP mole ratio;
   preheating the powder compact to a preignition temperature determined by the desired LEPP/HEPP mole ratio;
   producing a self-propagating combustion wave in the preheated powder compact to form a composite product of the desired LEPP rich LEPP/HEPP mole ratio.

2. The method of claim 1 wherein the LEPP and HEPP are selected from the group consisting of: $Al_4C_3$ (1200), $B_4C$ (1000), $Be_2C$ (1900), $CaC_2$ (1100), CdS (2000), CeS (3000), $CrB_2$ (2470), $Cr_3Si$ (1500), $Cr_5Si_3$ (1700), $CrSi_2$ (1800), FeB (1700), HfC (3900), $HfB_2$ (3520), $Ir_2S_3$ (1700), $LaB_6$ (2800), MnS (3000), MnSi (1550), $Mo_2B$ (1500), MoB (1800), $MoB_2$ (1500), $Mo_2C$ (1000), $Mo_3C_2$ (800), $MoS_2$ (2900), $Mo_3Si$ (1200), $Mo_5Si_3$, $MoSi_2$ (1900), $NbB_2$ (2400), $Nb_2C$ (2600), NbC (2800), $NbSi_2$ (1900), NiB (2000), SiC (1800), $TaB_2$ (2700), $Ta_2C$ (2600), TaC (2700), $TaSi_2$ (1800), $ThC_2$ (2930), TiB (3350), $TiB_2$ (3190), TiC (3210), $Ti_5(2500)$, $Si_3$ TiSi (2000), $TiSi_2$ (1800), $UC_2$ (1000), US (3000), $V_3B_2$ (2340), VB (2520), $VB_2$ (2670), VC (2400), $W_2B$ (1400), WB (1700), $W_2B_5$ (1300), $W_2C$ (800), WC (1000), $W_5Si_3$ (1200), $WSi_2$ (1500) $ZrB_2$ (3310), ZrC (3400), $Zr_2Si$ (2600), $Zr_5Si_3$ (2800), ZrSi (2700), $ZrSi_2$ (2100),
wherein the temperature is the adiabatic temperature (K) and the HEPP has a higher adiabatic temperature than the LEPP.

3. The method of claim 2 further comprising selecting a HEPP with a minimum adiabatic temperature and a LEPP with a maximum adiabatic temperature of about 2000 ±200K.

4. The method of claim 1 further comprising selecting the LEPP and HEPP with one element in common.

5. The method of claim 1 further comprising infiltrating the LEPP/HEPP composite with molten metal to form a substantially fully dense ceramic metal composite.

6. The method of claim 5 comprising infiltrating the LEPP/HEPP composite with a metal phase selected from aluminum, nickel, titanium, zirconium or alloys thereof.

7. The method of claim 1 comprising forming the powder compact of:
   (a) Nb, Al and C; or
   (b) Nb, Ge and C.

8. The method of claim 1 comprising selecting the HEPP from a metal aluminide.

9. The method of claim 8 comprising selecting the metal aluminide from the aluminides of nickel, copper and titanium.

10. The method of claim 1 wherein the self-propagating combustion wave is initialed by igniting the powder compact 11. The method of claim 1 comprising increasing the preignition temperature to increase the LEPP/HEPP mole ratio.

12. The method of claim 2 further comprising infiltrating the LEPP/HEPP composite with molten metal to form a substantially fully dense ceramic-metal composite 13. The method of claim 12 comprising infiltrating the LEPP/HEPP composite with aluminum, nickel, titanium, zirconium or alloys thereof 14. A LEPP rich combustion synthesis product formed by the process of claim 1.

15. A LEPP rich combustion synthesis product formed by the process of claim 2.

16. A substantially fully dense metal infiltrated LEPP rich combustion synthesis product formed by the process of claim 5.

17. A substantially fully dense metal infiltrated LEPP rich combustion synthesis product formed by the process of claim 12.

18. A LEPP rich combustion synthesis product formed by the process of claim 7.

19. A LEPP rich combustion synthesis product formed by the process of claim 9.

20. A substantially fully dense metal infiltrated LEPP rich combustion synthesis product formed by the process of claim 6.

* * * * *